United States Patent [19]

Fullenkamp

[11] Patent Number: 4,632,591
[45] Date of Patent: Dec. 30, 1986

[54] RADIALLY EXPANDABLE O-RING CONNECTOR

[75] Inventor: Eugene H. Fullenkamp, Batesville, Ind.

[73] Assignee: Hill-Rom Company, Inc., Batesville, Ind.

[21] Appl. No.: 621,836

[22] Filed: Jun. 18, 1984

[51] Int. Cl.$^4$ ............................................... F16B 7/16
[52] U.S. Cl. ................................. 403/227; 403/372; 403/373
[58] Field of Search ............... 411/32, 33, 24, 25, 411/55, 407, 26, 27, 28; 403/227, 372, 373

[56] References Cited

U.S. PATENT DOCUMENTS

| D. 261,804 | 11/1981 | Foster et al. | D24/1 |
|---|---|---|---|
| 631,765 | 8/1899 | Burk | 411/33 X |
| 755,668 | 3/1904 | Hurxthal | 248/297.2 X |
| 2,129,933 | 9/1938 | Hueglin | 230/232 |
| 2,336,044 | 12/1943 | Stuart | 237/53 |
| 2,456,480 | 12/1948 | Austin | 403/227 X |
| 2,512,908 | 6/1950 | Arndt | 179/91 |
| 2,513,193 | 6/1950 | Miller | 411/24 X |
| 2,572,617 | 10/1951 | Haury et al. | 175/298 |
| 3,050,194 | 8/1962 | Sinninger | 211/147 |
| 3,148,311 | 9/1964 | Conway et al. | 317/119 |
| 3,887,156 | 6/1975 | Hugonnier | 403/227 X |
| 4,045,980 | 9/1977 | Woodward et al. | 64/23 |
| 4,158,511 | 6/1979 | Herbenar | 403/113 |
| 4,212,445 | 7/1980 | Hagen | 248/245 |

FOREIGN PATENT DOCUMENTS

| 48225 | 3/1982 | European Pat. Off. . |
| 262559 | 7/1913 | Fed. Rep. of Germany . |
| 622220 | 11/1935 | Fed. Rep. of Germany | 403/227 |
| 840380 | 6/1952 | Fed. Rep. of Germany . |
| 631300 | 3/1927 | France . |
| 1188743 | 4/1920 | United Kingdom . |
| 322832 | 12/1929 | United Kingdom . |
| 619618 | 3/1949 | United Kingdom | 403/227 |
| 976189 | 11/1964 | United Kingdom . |
| 1021879 | 3/1966 | United Kingdom . |
| 1037700 | 8/1966 | United Kingdom . |
| 1207891 | 10/1970 | United Kingdom . |
| 2082893 | 3/1982 | United Kingdom . |

Primary Examiner—Cornelius J. Husar
Assistant Examiner—Joseph A. Fischetti
Attorney, Agent, or Firm—F. Kristen Koepcke; Brian J. Leitten

[57] ABSTRACT

A male-female connector is utilized to mount a holder to a mounting member. The connector includes a sleeve within which is disposed a gripper assembly. The gripper assembly comprises a plurality of elastic O-rings, each of which is positioned between a pair of beveled surfaces. When the beveled surfaces are converged toward one another, the O-rings ride-up upon the beveled surfaces and are radially expanded to frictional engagement with the socket wall.

7 Claims, 6 Drawing Figures

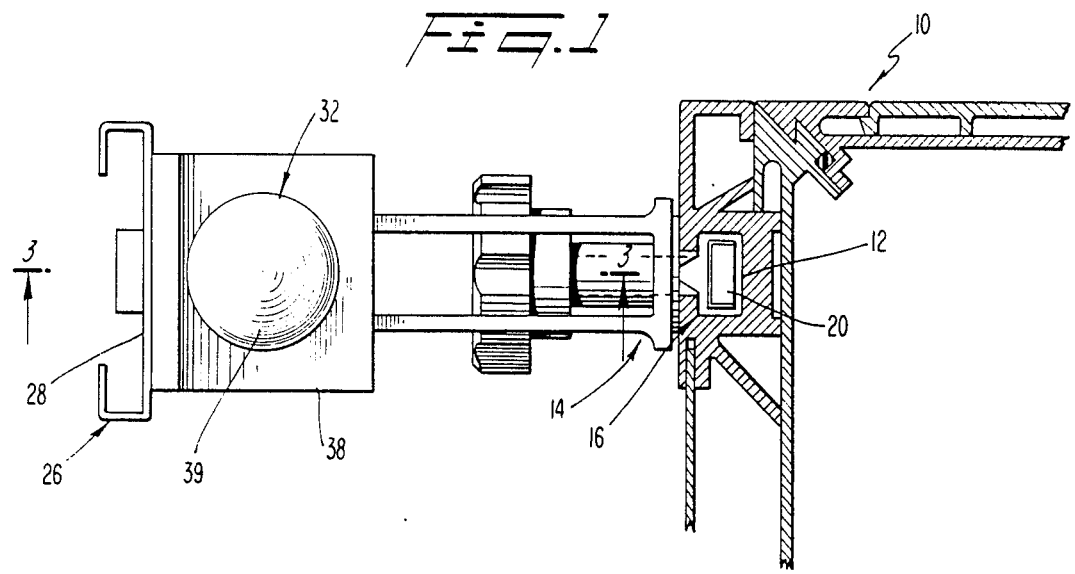
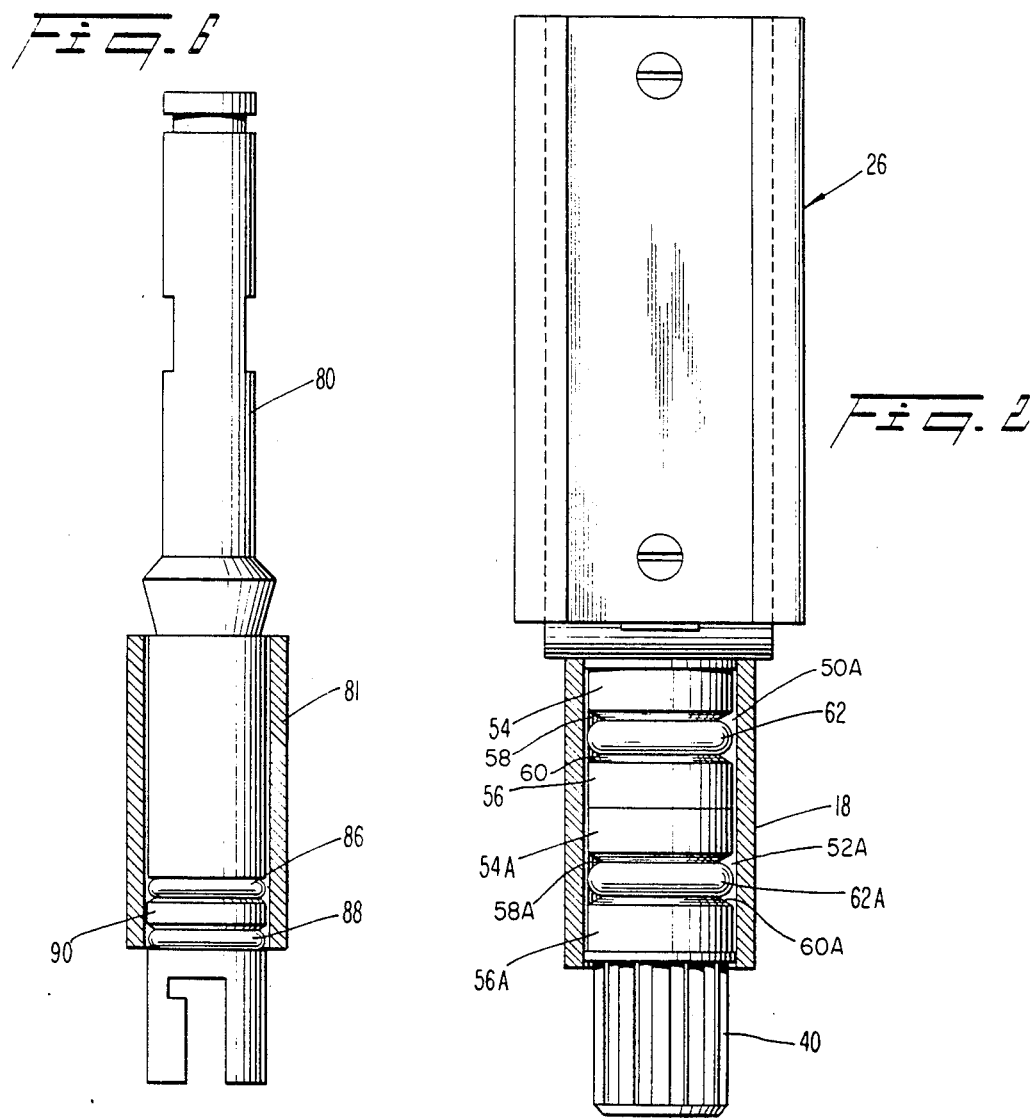

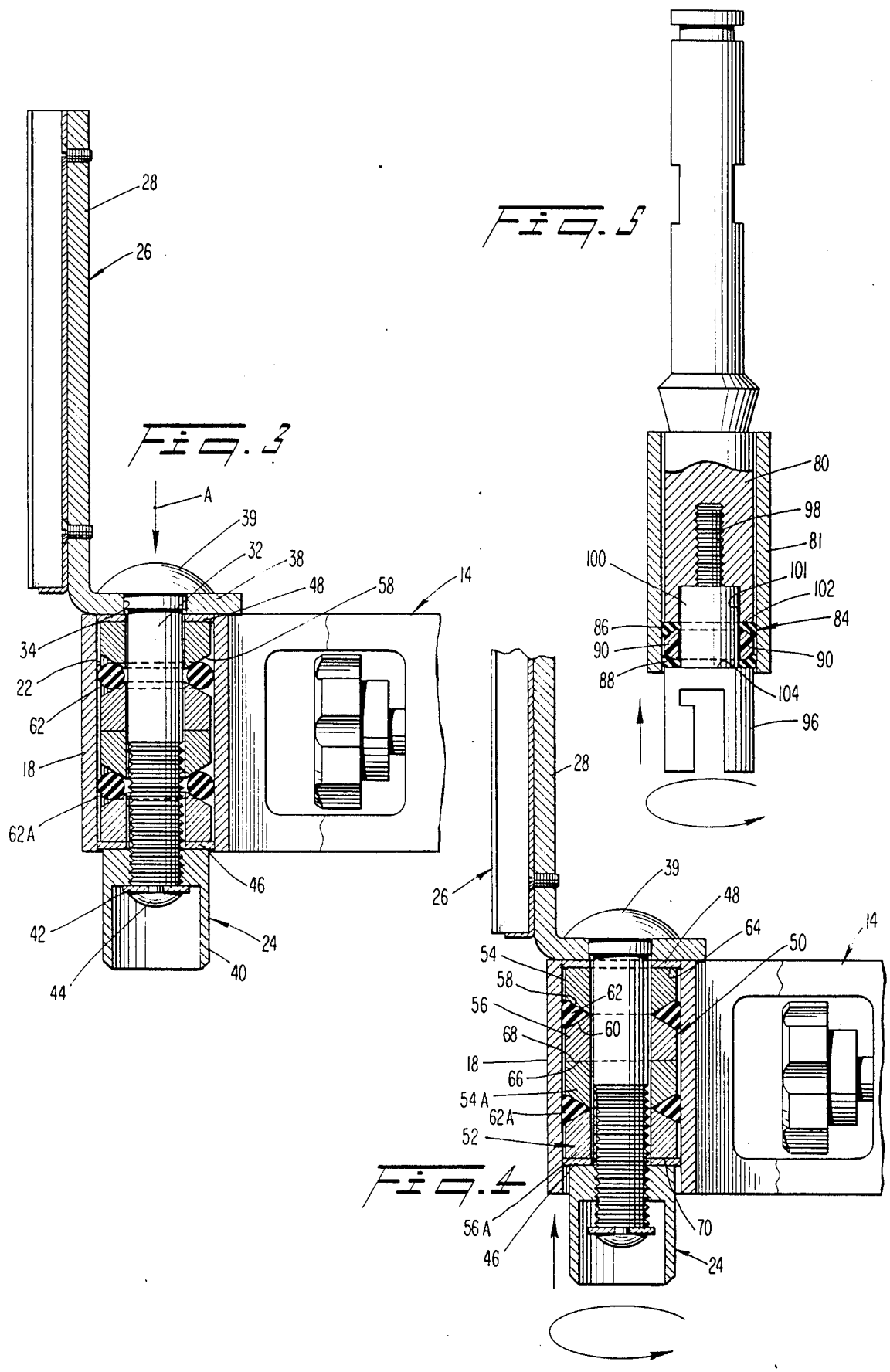

RADIALLY EXPANDABLE O-RING CONNECTOR

BACKGROUND AND OBJECTS OF THE INVENTION

The present invention relates to a male-female coupling apparatus and, in particular, to a quick-releasable coupling for a bracket.

Free-standing columns are commonly employed in hospital intensive care units in close proximity to a patient and are adapted to carry lighting, shelving, etc. One form of such a column is depicted in U.S. Pat. No. Des. 261,804 issued Nov. 10, 1981 to L. D. Foster et al, and in commonly assigned copending application Ser. No. 06/462,682 filed on Jan. 31, 1983 by Fullenkamp et al.

Such a free-standing column provides certain advantages over conventional wall mounted systems wherein the equipment and services are mounted on the head wall of the room. With wall mounted systems, there usually results a maze of cords and tubing running between the wall and the patient's bed which can restrict access to the patient and can be inadvertently damaged. Such inconveniences are greatly alleviated by a free-standing column which brings the necessary equipment and services into the immediate environment of the patient. The column affords a greater degree of access around the patient's bed and permits more efficient delivery of services to the patient.

The column is capable of supporting a wide variety of equipment and services, thereby rendering the column highly versatile, capable of servicing a wide variety of patients' needs. It is desirable, however, that the equipment be capable of convenient and rapid installation and detachment to accommodate emergency situations as well as to avoid interference with patient accessibility. With previous columns the removal or interchanging of equipment was not as convenient and rapid as would be desired in all cases.

In the above-mentioned Fullenkamp et al application, there is a disclosure of a holder which is slidable along a vertical track of the column and can be affixed at various elevations. The holder carries a removable mounting member, the latter being adapted to carry a piece of equipment. The mounting member includes a tongue having a hollow elastic cylinder which is releasably attachable within a socket of the holder. When the cylinder is compressed, e.g., by a rotary knob, the cylinder expands into frictional gripping relationship with the socket wall. Such a coupling has performed well, but room for improvement remains. In that regard, it has been found that even after the mounting member has been secured within the socket, the mounting arm is still capable of slight tilting movement relative to the holder. That is, when weight is applied to the mounting member (e.g., by placing a piece of medical equipment thereon), the front end of the tongue (i.e., the end opposite the knob) may tend to tilt slightly downwardly within the socket. It would be desirable to minimize the extent to which such tilting can occur.

In addition, there may occur some difficulty in removing the tongue from the holder, due to contact of portions of the plug with the sleeve. That is, portions of the plug when in a relaxed state may not retract radially from the sleeve sufficiently to permit a smooth, unobstructed removal or insertion of the tongue.

It has also been found that a considerable number of rotations of the knob may be necessary to fully expand the plug. This increases the time and overall effort needed to install and remove the mounting member.

It is, therefore, an object of the present invention to minimize or obviate problems of the type discussed above.

Another object is to minimize the amount of tilting which the tongue can undergo within the sleeve.

A further object is to facilitate a smooth, unobstructed insertion and removal of the tongue relative to the sleeve.

Yet another object is to minimize the number of rotations of the knob necessary to tighten and release the tongue.

SUMMARY OF THE INVENTION

These objects are achieved by the present invention which relates to a male-female connector of the type comprising a socket having a cylindrical wall and a tongue releasably securable within the socket. The tongue comprises at least one elastic O-ring sized to pass into and from the socket in its relaxed state. A first surface-defining member defines a first surface on one side of the O-ring. A second surface defining member defines a second surface on the opposite side of the O-ring. At least one of the first and second surfaces includes a bevel engageable with an inner diameter of the O-ring. At least one of the first and second surfaces is movable in a longitudinal direction of the tongue. An actuator is provided for moving the movable surface longitudinally toward the O-ring to cause the inner diameter of the O-ring to ride-up on the bevel and become radially expanded into frictional engagement with the socket wall.

Preferably, the at least one O-ring comprises a plurality of O-rings, each having first and second surfaces facing opposite sides thereof.

THE DRAWINGS

The objects and advantages of the invention will become apparent from the following detailed description of a preferred embodiment thereof in connection with the accompanying drawings in which like numerals designate like elements, and in which:

FIG. 1 is a plan view of a holder which includes a male-female connector according to the present invention, the holder being mounted in a free-standing column a portion of which is depicted in cross-section;

FIG. 2 is a front elevational view of the holder, with a portion thereof broken away to depict an internal gripper assembly;

FIG. 3 is a side elevational view of the holder, a portion of which is in vertical cross-section, depicting the internal gripper assembly in a relaxed condition;

FIG. 4 is a view similar to FIG. 3, with the internal gripper assembly in condition;

FIG. 5 is a side elevational view of another preferred embodiment of the present invention, shown partially in longitudinal section, with the gripper assembly thereof in a tightened condition; and FIG. 6 is a side elevational view of the embodiment depicted in FIG. 5, with the gripper assembly in a relaxed condition.

DETAILED DESCRIPTION OF A PREFERRED EMBODIMENT OF THE INVENTION

Depicted in FIG. 1 is a section of a free-standing column 10 suited for use in a hospital, for example, to support medical equipment of various sorts. Such a column is described in commonly assigned, copending application Ser. No. 06/462,682 filed on Jan. 31, 1984 by Fullenkamp et al, the disclosure of which application is hereby incorporated by reference herein.

The column includes a plurality of vertical channels 12 (only one of which being depicted in FIG. 1). The channel 12 is sized to receive a holder 14, the latter being sized and configured to carry a piece of equipment (not shown). The holder 14 includes a base portion 16 which is to be mounted for sliding movement within the channel 12, and a socket portion 18 adapted to receive a mounting arm to hold a piece of equipment. The base portion carries a slide lock assembly 20 which is adapted to releasably secure the holder at various locations along the channel. The slide lock assembly is described in detail in the afore-mentioned application of Fullenkamp et al and need not be further described herein. While the vertical channel 12 is depicted in FIG. 1 as part of a freestanding column 10, the holder 14 may also be employed with vertical channels included in hospital flatwall modular headwall units, in wall-mounted accessory tracks, or in other similarly constructed channels.

The socket portion of the holder includes an open-ended bore 22 which is sized to receive the tongue 24 of a mounting arm or bracket 26. The tongue 24 is insertable into the bore 22 in the direction of arrow A in FIG. 3. The free end 28 of the bracket 26 can be arranged to receive any suitable device. In the medical field, for example, the bracket can carry an infusion pump, I.V. units, or bumpers, timers, etc.

The tongue comprises a pin preferably in the form of a threaded bolt 32 which extends through an opening 34 in a base leg 38 of the bracket. The bolt includes a head 39 at one end and is adapted to receive a threaded actuator knob 40 at its other end. The knob can be extended and retracted along the longitudinal axis of the tongue by being rotated in one direction or the other. A stop plate 42 is connected to the bolt by a screw 44 in order to secure the knob 40 in place. A first flat washer 46 is mounted on the bolt adjacent the knob 40, and a second flat washer 48 is mounted on the bolt adjacent the bracket leg 38, the flat washers 46, 48 being formed of any suitably hard material, preferably steel.

Sandwiched between the flat washers 46, 48 are a pair of gripper assemblies 50, 52. The gripper assemblies 50, 52 are identical. The gripper assembly 50 comprises a pair of beveled washers 54, 56 having one beveled side surface 58, 60, with an elastic O-ring 62 disposed between the beveled sides so as to be disposed within an annular space 50A defined by the surfaces 58, 60. The beveled sides 58, 60 face one another and project into the O-ring inner diameter. In an untightened condition, the mutually facing beveled sides 58, 60 are spaced apart longitudinally, i.e., in the direction of the longitudinal axis of the bolt (FIG. 3).

The other gripper assembly 52 is identical to the first gripper assembly 50 and includes two beveled washers 54A, 56A having an O-ring 62A disposed therebetween so as to be disposed within an annular space 52A defined by beveled surfaces 58A, 60A of those washers.

The arrangement is such that the beveled washers have flat (non-beveled) sides in engagement with corresponding flat surfaces. That is, the flat side 64 of one washer 54 engages the second washer 48, and the flat side 66 of the other washer 56 engages a flat side 68 of a beveled washer 54A of the other gripper assembly 52. The flat side 70 of the remaining beveled washer 56A engages the first flat washer 46.

The beveled washers are preferably formed of a hard material such as steel although other materials are suitable.

The elastic O-rings 62, 62A are formed of any suitable elastic material, such as rubber or plastic for example, and are sized such that in a relaxed state, their outer diameters are smaller than the diameter of the bore 22 of the holder 26. Thus, the tongue 24 can be easily inserted into or removed from the bore. The cross-section of the O-rings 62, 62A is preferably circular, but other configurations might be possible.

When the knob 40 is tightened, the beveled faces of the beveled washers converge and urge the respective O-rings 62, 62A radially outwardly (FIG. 4). Thus, if the knob 40 is tightened while the tongue is disposed within the bore, the O-rings 62, 62A will be radially compressed against the wall of the bore 22 to frictionally secure the tongue within the bore.

Preferably, the beveled sides of the associated beveled washers are arranged to contact one another when the O-rings have been sufficiently compressed (FIG. 4). As a result, there is relatively continuous metal-to-metal contact among the washers in the longitudinal direction. Such a "rigid column" effect resists the tendency of the beveled washers to tilt within the bore.

IN OPERATION, when the knob 40 is tightened, the beveled faces apply radially outward forces to the O-rings. That is, the inner diameter of the O-rings 62, 62A is enlarged in order to compress the O-rings frictionally against the bore wall. The tightening operation is performed in response to relatively little rotation of the knob since the beveled faces quickly expand the O-rings. Expansion of the O-rings ceases when the associated beveled sides abut one another.

If a heavy weight is applied to the mounting member 26, appreciable tilting of the tongue is resisted by the rigid column effect of the interengaging washers.

When it is desired to remove the tongue, the knob 40 is unscrewed, enabling the O-rings 62, 62A to retract. Thus, the inner diameter of the O-rings rapidly contracts to effect an appreciable amount of withdrawal of the O-ring from the bore wall. That is, the extent of such withdrawal is greater than in the case of the earlier described plug of the Fullenkamp et al application, wherein the plug was not pushed in the radial direction during a securing operation, but rather was pushed in the longitudinal direction. Thus, the inner diameter of the plug was not caused to increase, but in fact, probably decreased during the securing step. By virtue of that fact, the plug was not able to retract radially to the same extent as the present O-rings. This means that the O-rings of the present invention are fully retracted from the bore wall to present no appreciable resistance to removal (or insertion) of the tongue.

Furthermore, the number of rotations of the knob required to expand the O-rings into firm engagement with the bore wall is much less in the present invention due to the fact that the O-rings are being positively expanded by radially outwardly directed forces applied directly against the inner diameter. Thus, the arrangement can be such that the O-rings can be amply tightened against the bore wall after 1 to 1½ turns of the knob.

While it might be possible in some cases to employ a single gripper assembly 50 or 52, the use of a plurality of gripper assemblies is preferred to provide greater resistance to tilting of the tongue, i.e., to provide longitudinally spaced contact between the bore wall and the O-rings.

In FIGS. 5, 6 there is depicted an embodiment of the present invention which is adapted to secure a pin-shaped tongue 80 within a sleeve (not shown). The pin 80 for example, can be employed to mount an item such as an I.V. unit to a hospital bed. That is, the pin would be affixed to the bed frame and the I.V. unit (not shown) would include a sleeve 81 which fits over a free end of the pin. That free end includes a gripper assembly 84 which comprises a pair of O-rings 86, 88 disposed on opposite sides of a beveled washer 90 which is beveled on both sides. An actuator knob 96 is threadable into a threaded recess 98 of the pin 80 so as to be longitudinally extensible and retractable. A cylindrical extension 100 of the knob extends through the washer and O-rings 86, 88, 90, and fits into a cylindrical pocket 101 in the pin. The O-rings 86,88 are compressed between a flat surface 102 defined by the pin, and a flat surface 104 on the knob 96. When the knob is tightened, the O-rings are expanded by the beveled sides of the washer 90 until the beveled sides contact the flat surfaces 102, 104. The O-rings are thus expanded into contact with the sleeve wall (not shown) to secure the sleeve to the pin.

Although the present invention has been described in connection with preferred embodiments thereof, it will be appreciated by those skilled in the art that additions, modifications, substitutions, and deletions may be made without departing from the spirit and scope of the invention as defined in the appended claims.

What is claimed is:

1. In combination, an apparatus defining a channel and a holder slidably mounted in said channel and securable at selected positions therein, said holder including a socket having a cylindrical inner wall and a bracket adapted to carry a piece of equipment, said bracket carrying a tongue which is longitudinally slidable into a first end of said socket, said tongue comprising:

a pin carried at a first end thereof by said bracket and projecting coaxially into said first end of said socket, first and second elastic O-rings slidably mounted coaxially on said pin in longitudinally spaced relationship in said socket, first and second surface-defining means disposed coaxially around said pin within said socket on opposite sides of said first O-ring, said first and second surface-defining means including first and second rigid bevels, respectively, said bevels directed toward one another and engageable with an inner diameter of said first O-ring, the latter disposed within a first annular space defined by said first and second bevels, at least said second surface-defining means being movable relative to said pin along a longitudinal axis of said pin, third and fourth surface-defining means disposed coaxially around said pin within said socket on opposite sides of said second O-ring, said third and fourth surface-defining means including third and fourth rigid bevels, respectively, said last-named bevels directed toward one another and engageable with an inner diameter of said second O-ring, the latter disposed within a second annular space defined by said third and fourth bevels, said third and fourth surface-defining means being movable relative to said pin along said longitudinal axis of said pin, and means defining a threaded knob threadedly mounted on a second end of said pin and rotatable thereon in a first direction to cause said first O-ring to ride-up on said first and second bevels, and said second O-ring to ride up on said third and fourth bevels, such that said first and second O-rings become radially outwardly expanded from a relaxed state into frictional engagement with said socket wall while confined substantially within the limits of said first and second annular spaces, respectively, said knob-defining means projecting from a second end of said socket so as to be accessible for being manually gripped and rotated, said first and second O-rings, said first, second, third, and fourth surface-defining means, and said knob-defining means being sized to pass freely longitudinally into and from said first end of said socket while secured on said pin and with said first and second O-rings disposed in a relaxed state.

2. In the combination according to claim 1, wherein said fourth surface-defining means is separate from said knob-defining means and movable relative thereto.

3. In the combination according to claim 1, wherein said first, second, third, and fourth surface-defining means also form cylindrical surfaces extending longitudinally from radially outer ends of the respective bevels and lying closely adjacent said socket wall.

4. In the combination according to claim 1, wherein said second and third surface-defining means are separate from one another and movable relative to one another.

5. In the combination according to claim 1, wherein at least said first and fourth surface-defining means each comprising a rigid washer, each said washer carrying its respective bevel on one side and having a radially planar surface on the other side.

6. In the combination according to claim 1, wherein said first and second surface-defining means are longitudinally interengageable to terminate radial expansion of said first O-ring, and said third and fourth surface-defining means are longitudinally interengageable to terminate expansion of said second O-ring.

7. In the combination according to claim 1, wherein said apparatus defining a channel comprises a freestanding column for use in a hospital intensive care facility.

* * * * *